United States Patent
Montresor

[11] Patent Number: 5,816,202
[45] Date of Patent: Oct. 6, 1998

[54] HIGH EFFICIENCY EXPLOSION ENGINE WITH A DOUBLE ACTING PISTON

[76] Inventor: Gianfranco Montresor, Via Ruffoni, 5, Verona, Italy

[21] Appl. No.: 877,287

[22] Filed: Jun. 17, 1997

Related U.S. Application Data

[63] Continuation-in-part of Ser. No. 709,469, Sep. 5, 1996, Pat. No. 5,676,097.

[30] Foreign Application Priority Data

Sep. 22, 1995 [IT] Italy ................. VR95A0079

[51] Int. Cl.⁶ ............................ F02B 41/00
[52] U.S. Cl. ............... 123/61 R; 123/62; 123/63
[58] Field of Search ............... 123/61 R, 62, 123/63

[56] References Cited

U.S. PATENT DOCUMENTS

| | | | |
|---|---|---|---|
| 2,070,769 | 2/1937 | Wurtele | 123/61 R |
| 2,392,052 | 1/1946 | Matheisel | 123/61 R |
| 3,340,857 | 9/1967 | Brown. | |
| 4,414,927 | 11/1983 | Simoin | 123/61 R |
| 4,913,100 | 4/1990 | Eickmann | 132/61 R |
| 5,285,752 | 2/1994 | Reed et al. | 123/61 R |

FOREIGN PATENT DOCUMENTS

| | | |
|---|---|---|
| 3607421 | 9/1987 | Germany. |
| 3842802 | 6/1990 | Germany. |

*Primary Examiner*—Marguerite McMahon
*Attorney, Agent, or Firm*—Notaro & Michalos P.C.

[57] ABSTRACT

A high-efficiency explosion engine has a double-acting central piston mounted on a shaft within a cylinder to form two combustion chambers. Auxilliary pistons mounted on the ends of the shaft control the intake of gases to the combustion chambers. In one embodiment, the auxilliary pistons are mounted axially offset from the piston shaft. In a further embodiment, fuel is provided through the piston shaft into the combustion chambers dependant upon the position of the piston within the cylinder.

8 Claims, 6 Drawing Sheets

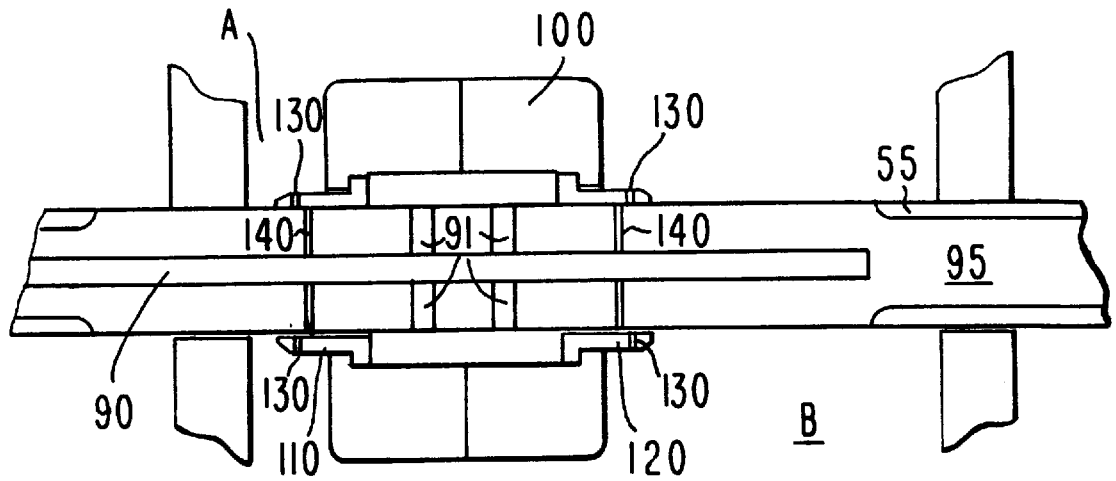
FIG. 5
FIG. 6
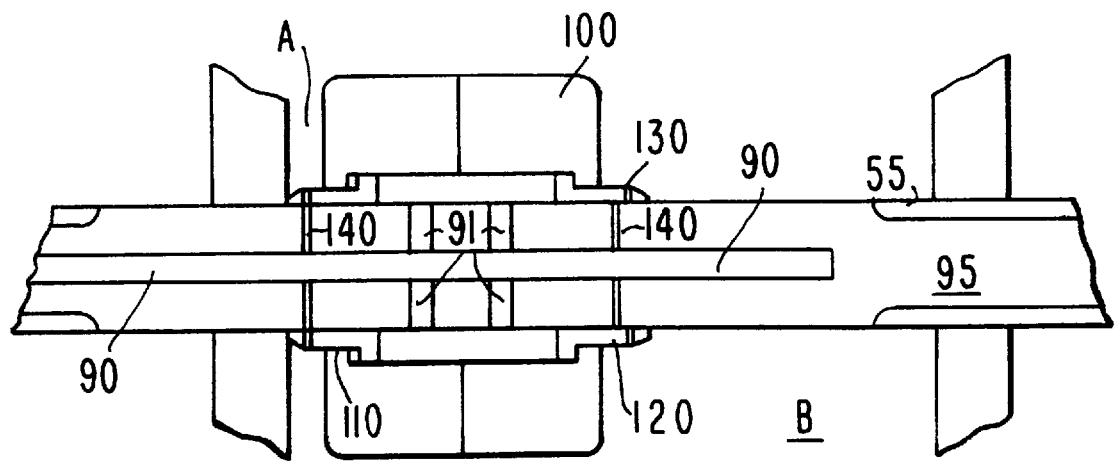

HIGH EFFICIENCY EXPLOSION ENGINE WITH A DOUBLE ACTING PISTON

CROSS REFERENCE TO RELATED APPLICATIONS

This is a continuation-in-part of U.S. patent application Ser. No. 08/709,469, filed Sep. 5, 1996, and now U.S. Pat. No. 5,676,097, the entirety of which is hereby incorporated by reference.

FIELD AND BACKGROUND OF THE INVENTION

The present invention relates generally to the field of double piston engines and in particular to an engine which cooperates with feed valves and inlets to improve the efficiency of the engine.

SUMMARY OF THE INVENTION

It is an object of this invention to provide an explosion engine with a double acting piston with improved safety, efficiency and optimized inlet strokes.

Accordingly, an explosion engine having a central double acting piston is provided in which gas intake valves are located on half shafts of the central piston. The valves operation is powered by auxilliary lateral pistons and closing pressure generated by the double acting central piston. This arrangement permits supercharging of the engine beginning with the first piston stroke, rather than only at high RPMs following a warm up cycle, such as with conventional turbocompressors.

In one alternative arrangement, the auxiliary pistons are located on separate piston shafts from the half shafts of the central double-acting piston. The separate piston shafts are each connected to the half shafts of the central piston by a transmission linkage.

In another alternative, an engine is provided with a central duct through the half shafts for injecting fuel into the central piston chamber. A pair of coaxial sliders having radial holes therethrough cause fuel to be injected through radial ducts in the shaft connected to the central duct into the combustion chamber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a schematic view of a piston arrangement for an engine according to another embodiment of the invention;

FIG. 6 is a schematic view of the piston arrangement of FIG. 5 in a different working phase.

DESCRIPTION OF THE PREFERRED EMBODIMENTS

Figure 1:
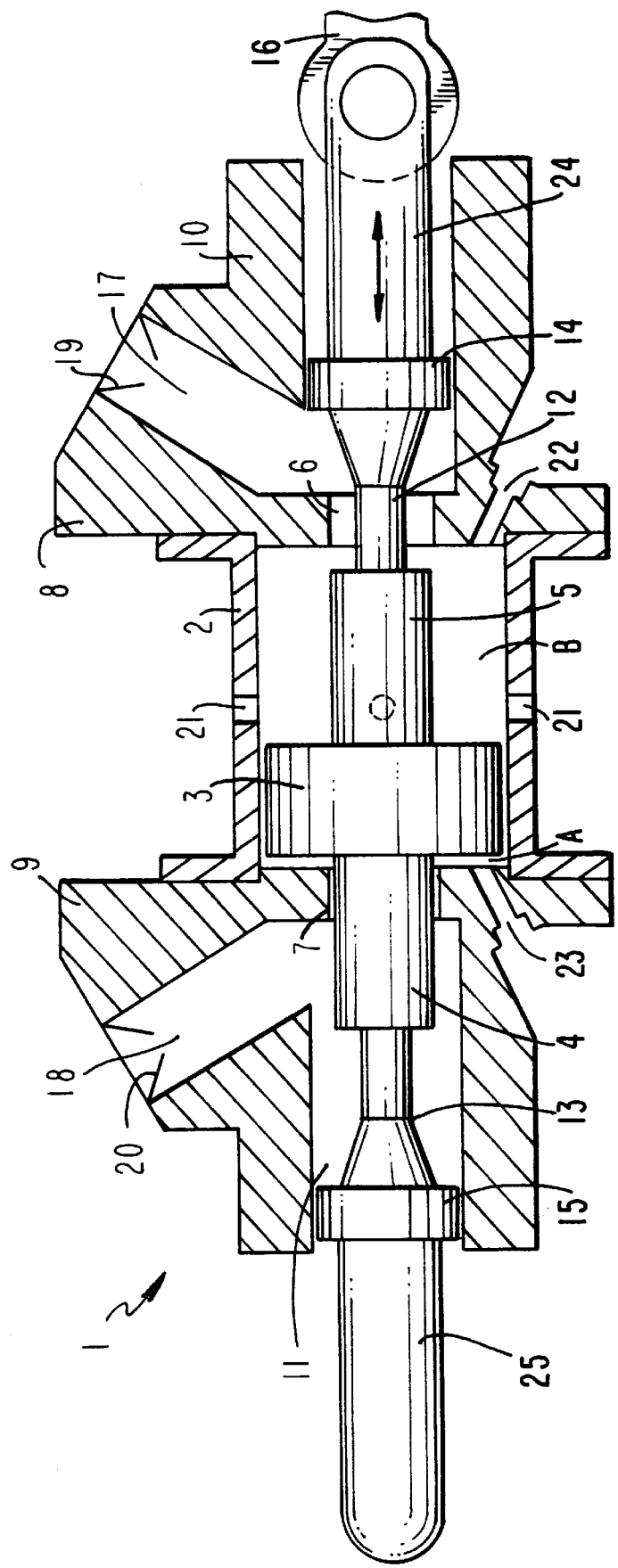
FIG. 1 is a schematic view of an engine previously disclosed by this inventor.
Figure 2:
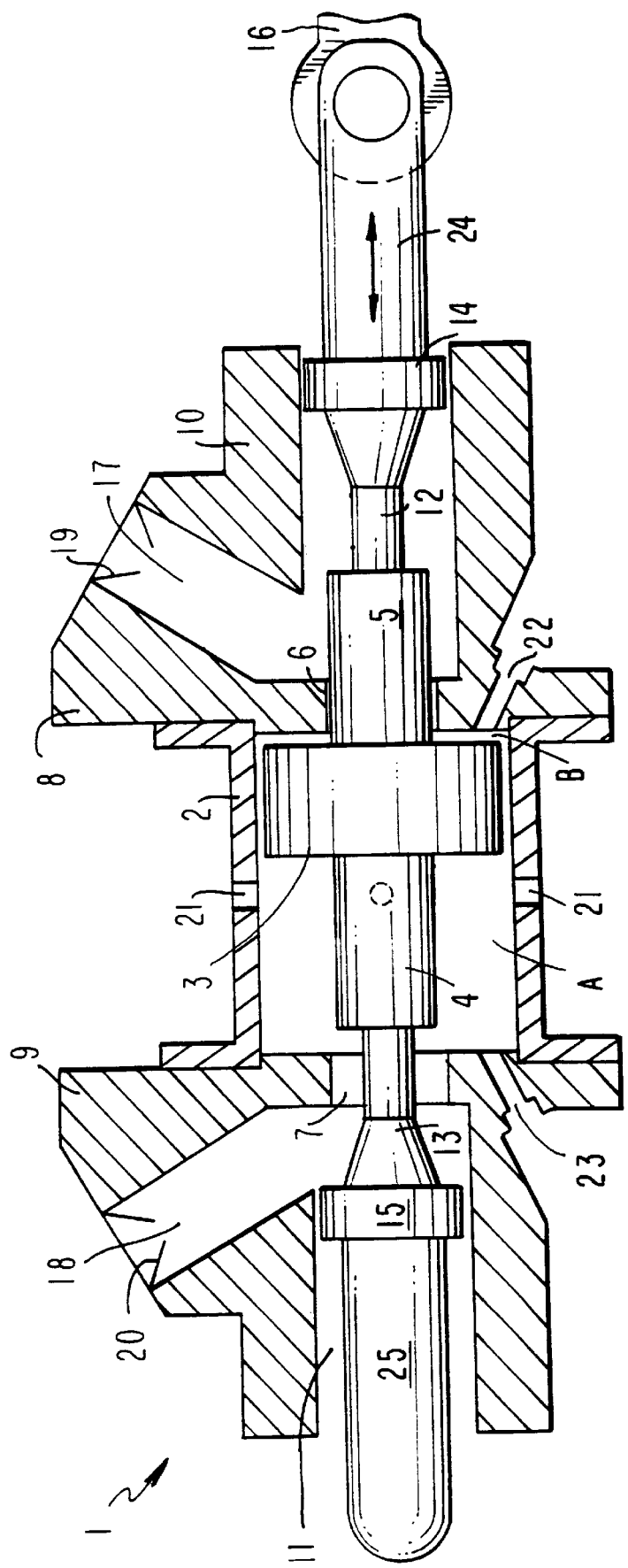
FIG. 2 is a schematic view of the engine in FIG. 1 in a different working position.

Referring to the drawings, FIGS. 3–7 show alternative embodiments of the double-acting piston explosion engine, in which the same or similar elements are indicated with like reference numerals.

Figure 3:
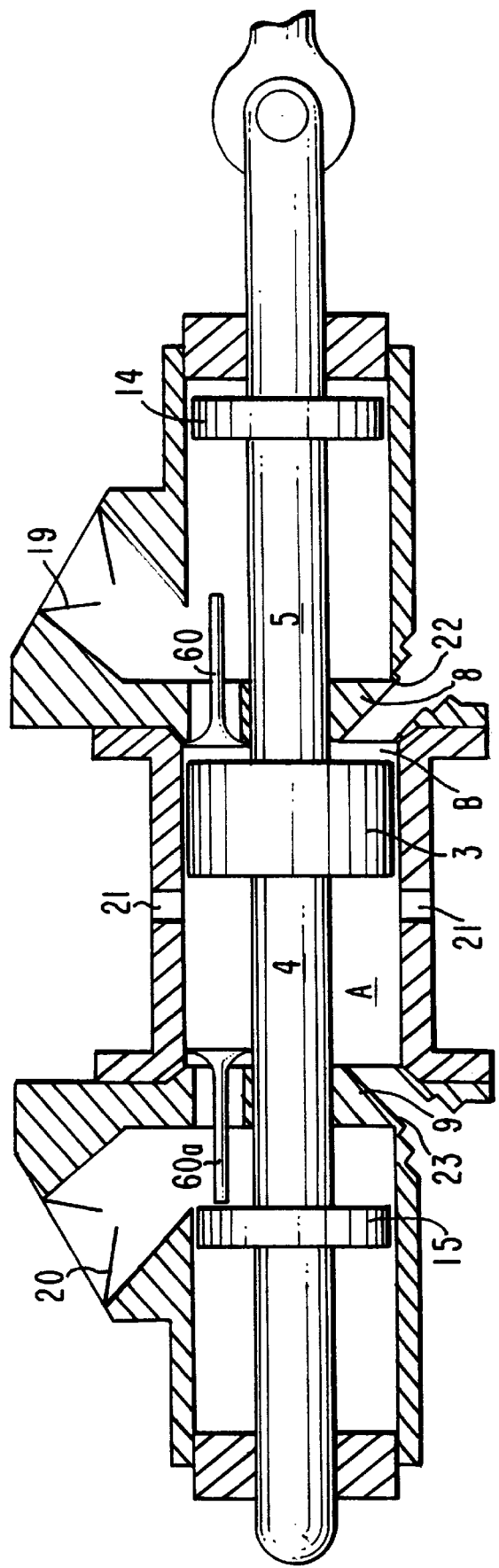
FIG. 3 is a schematic view of an engine according to one embodiment of the present invention.

An engine in which the half-shafts 4, 5 are smooth and make a sealed slidable connection through bodies 8, 9 is displayed in FIG. 3. Gas intake valves 60, 60a are used to allow combustion gas to enter the chambers A, B around central piston 3. Gas intake valves 60, 60a are moved into an open position by contact with auxilliary pistons 14, 15 during the engine piston stroke. The valves 60, 60a are closed by either pressure generated by the central piston 3, or in a preferred embodiment, by a spring or other biasing means. One or more pairs of gas intake valves 60, 60a may be arranged around the heads of bodies 8, 9.

In this embodiment, the engine may be arranged to operate in a supercharging mode by increasing the diameters of the auxilliary pistons 14, 15 and the surrounding chambers. Supercharging operation can commence beginning with the first cycle of the engine, rather than only at high RPMs as with conventional turbocompressors.

Figure 4:
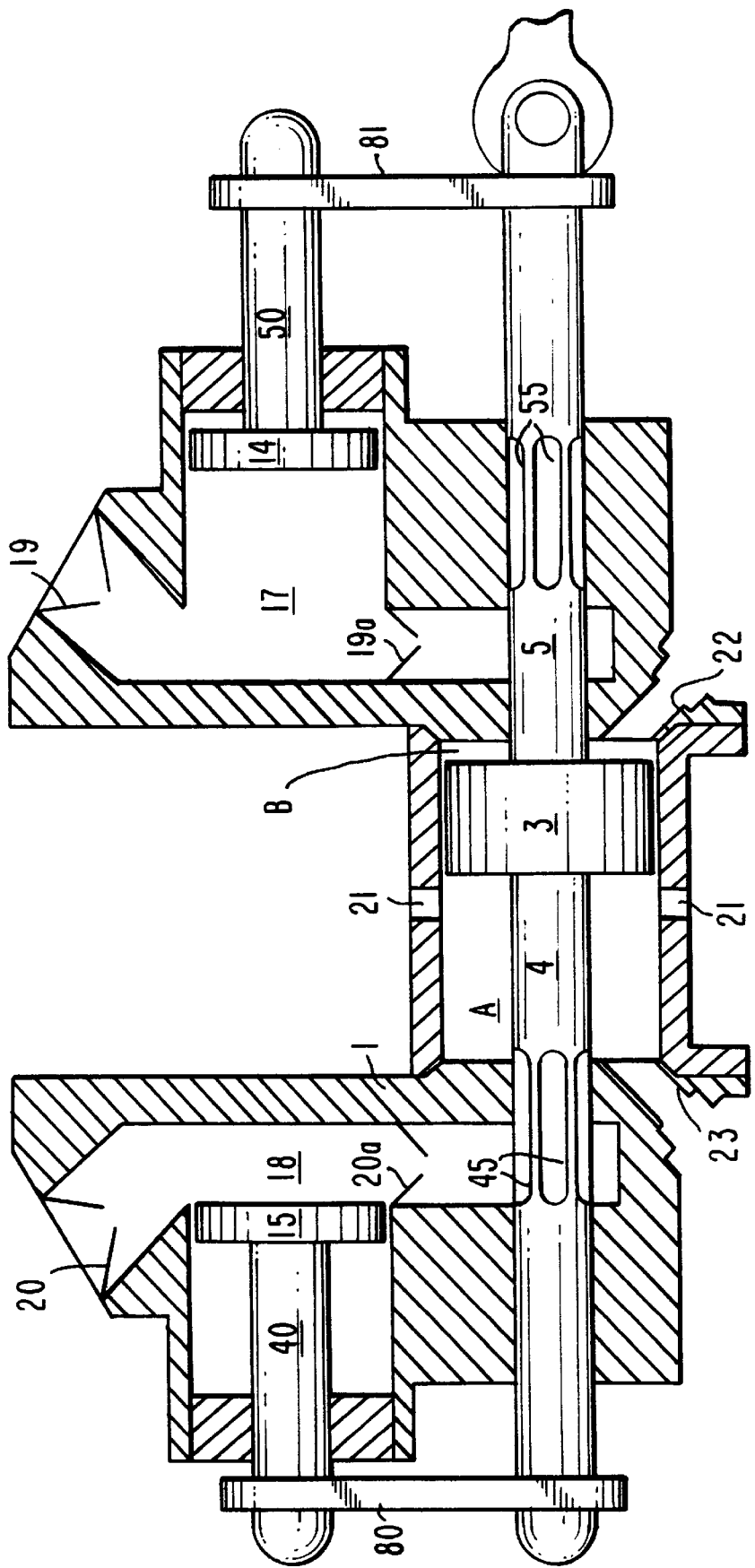
FIG. 4 is a schematic view of an engine according to a second embodiment of the present invention.

In FIG. 4, a series of longitudinal slots or grooves are made in the half shafts 4, 5 of the central piston 3 to allow combustion gas to enter chambers A and B through bodies 8, 9. In this arrangement, fuel injection is in close proximity to the spark plugs (not shown) which can be positioned in seats 22, 23.

Auxilliary pistons 14, 15 are separated from half-shafts 4, 5 and placed on auxilliary half-shafts 40, 50. Auxilliary half-shafts 40, 50 are connected by linkage bars 80, 81 to half-shafts 4, 5.

Further, a second set of inlet valves 19a, 20a are located within bodies 8, 9 at the lower end of openings 17, 18. Inlet valves 19, 19a, 20, 20a can all be of the blade type, or they may be replaced by rotary valves.

Figure 7:
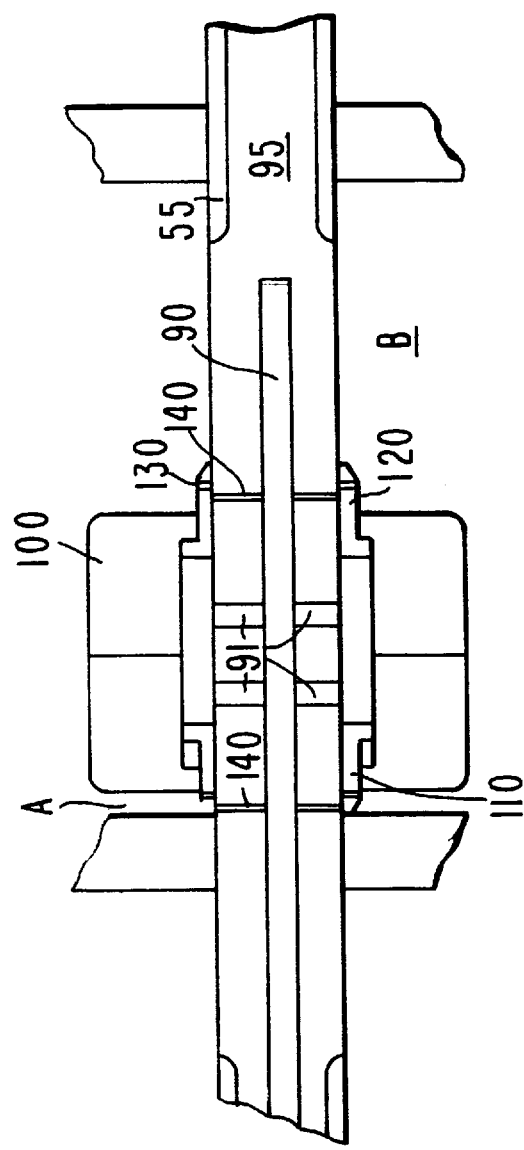
FIG. 7 is a schematic view of the piston arrangement of FIG. 5 in a third phase.

Turning now to FIGS. 5–7, a third alternative engine is shown in the compression, injection and explosion stages, respectively. The engine has a central fuel injection duct 90 through piston shaft 95. Fuel may be provided to the fuel injection duct 90 using a pump (not shown) at the free end of piston shaft 95. The fuel may be refrigerated as well.

Radial ducts 140 through piston shaft 95 are arranged around the circumference of the shaft 95. A pair of distributors 110, 120 are oriented coaxial around shaft 95 and are slidable along shaft 95. Central piston 100 surrounds the ends of distributors 110, 120.

Radial holes 130 through each of the distributors 110, 120 allow gasoline, or other fuel, to flow through central fuel injection duct 90, radial ducts 140 and into chambers A and B. The movement of the central piston 100 determines the position of the distributors 110, 120, which in turn controls the opening and closing of the passage of fuel through the radial ducts 140 and radial holes 130 into the combustion chambers A and B.

The distributors 110, 120 may be maintained under pressure by either the fuel or other biasing means. As shown, fuel pressure ducts 91 are shown through piston shaft 95 to allow fuel to flow in between distributors 110, 120 and surrounding central piston 100 to maintain pressure.

This arrangement allows for further increased efficiency due to improved engine cooling through the use of refrigerated fuel, and the fuel injection into the combustion chambers A and B occurs when the intake openings and exhaust openings are closed.

While a specific embodiment of the invention has been shown and described in detail to illustrate the application of the principles of the invention, it will be understood that the invention may be embodied otherwise without departing from such principles.

What is claimed is:

1. A high-efficiency engine having a double-acting central piston cooperating with auxilliary feed and inlet units, the engine comprising:

a cylinder having a central axis and in which a piston slides and on said central axis a through-shaft is fixed, said shaft being subdivided by the piston into two coaxial half-shafts having outer ends provided with auxilliary pistons slidably positioned within inlet chambers, and exhaust openings provided in the central part of the cylinder;

at least one of the two free ends of the half-shafts being connected to a connecting rod;

said inlet chambers being provided with non-return valves for permitting gases to be fed into the inlet chambers; and at least one pair of gas intake valves oriented with one valve through each end of the cylinder on opposite sides of the piston, the gas intake valves being controlled by the auxilliary pistons for permitting gases to be cyclically fed from the inlet chambers to the cylinder.

2. A high-efficiency engine having a double-acting central piston cooperating with auxilliary feed and inlet units, the engine comprising:

a cylinder having a central axis and in which a piston slides and on said central axis a through-shaft is fixed, said through-shaft being subdivided by the piston into two coaxial half-shafts having outer ends provided with auxilliary pistons slidably positioned within inlet chambers, and exhaust openings provided in the central part of the cylinder;

at least one of the two free ends of the half-shafts being connected to a connecting rod;

said inlet chambers being provided with non-return valves for permitting gases to be fed into the inlet chambers; and a plurality of axial grooves in the half-shafts for permitting gases to be cyclically fed from the inlet chambers to the cylinder.

3. A high-efficiency engine according to claim 2, wherein the auxilliary pistons are provided on a pair of auxilliary shafts oriented parallel to and axially offset from the half-shafts.

4. A high-efficiency engine according to claim 3, wherein the gases are fed to the cylinder in close proximity to a spark plug inserted into the cylinder for igniting the gases.

5. A high-efficiency engine according to claim 3, further comprising means for feeding fuel to the cylinder through the through-shaft.

6. A high-efficiency engine according to claim 2, further comprising means for feeding fuel to the cylinder through the through-shaft.

7. A high efficiency engine according to claim 6, wherein the fuel is fed depending upon the position of the piston within the cylinder.

8. A high efficiency engine according to claim 6, wherein the means for feeding fuel comprises a central axial fuel duct through the half-shafts; radial fuel ducts through the half-shafts open to the central axial fuel duct at one end; a pair of slidable distributors spaced apart around the half shafts within the cylinder, each having radial fuel holes therethrough for cyclically aligning with the radial fuel ducts, the piston surrounding at least a portion of each of the distributors, whereby when the radial fuel holes are aligned with the radial fuel ducts, fuel is permitted to pass from the central axial fuel duct into the cylinder.

* * * * *